United States Patent

Kwon

[11] Patent Number: 6,067,305
[45] Date of Patent: May 23, 2000

[54] COMPUTER TELEPHONE INTEGRATION EXCHANGE SYSTEM

[75] Inventor: Yang-Hae Kwon, Seoul, Rep. of Korea

[73] Assignee: Samsung Electronics Co., Ltd., Suwon, Rep. of Korea

[21] Appl. No.: 08/780,138

[22] Filed: Dec. 26, 1996

[30] Foreign Application Priority Data

Dec. 26, 1995 [KR] Rep. of Korea ........................ 95-56569

[51] Int. Cl.⁷ .............................. H04I 15/00; H04L 12/28
[52] U.S. Cl. ............................ 370/524; 370/524; 370/420; 370/421; 370/352; 379/93; 379/219; 379/226
[58] Field of Search ..................................... 370/524, 352, 370/355, 419, 420, 421, 522, 110, 62, 84, 85; 379/88.17, 93.01, 93.09, 93.14, 219, 226, 227, 242, 204, 396, 94, 100

[56] References Cited

U.S. PATENT DOCUMENTS

| | | | |
|---|---|---|---|
| 4,653,090 | 3/1987 | Hayden | 379/204 |
| 4,698,801 | 10/1987 | Hatano et al. | 370/58 |
| 4,922,490 | 5/1990 | Blakley | 370/110.1 |
| 5,204,860 | 4/1993 | Sparks | 370/110.1 |
| 5,276,687 | 1/1994 | Miyamotor | 370/110.1 |
| 5,305,312 | 4/1994 | Fornek et al. | 370/62 |
| 5,450,412 | 9/1995 | Takebayashi et al. | 370/95.1 |
| 5,461,620 | 10/1995 | Bergler et al. | 370/84 |
| 5,463,628 | 10/1995 | Sorensen | 370/110.1 |
| 5,469,441 | 11/1995 | Hesdahl et al. | 370/110.1 |
| 5,481,605 | 1/1996 | Sakurai et al. | 379/243 |

FOREIGN PATENT DOCUMENTS

| | | |
|---|---|---|
| 88 11 4366 | 7/1987 | European Pat. Off. . |
| 0 356 568 | 3/1990 | European Pat. Off. . |
| 88 11 4368 | 3/1990 | European Pat. Off. . |
| 2 195 863 | 4/1988 | United Kingdom . |
| 2268358 | 1/1994 | United Kingdom . |
| 2 296 622 | 7/1996 | United Kingdom . |
| US86/00505 | 8/1986 | WIPO . |

*Primary Examiner*—Michael Horabik
*Assistant Examiner*—Man Phan
*Attorney, Agent, or Firm*—Robert E. Bushnell, Esq.

[57] ABSTRACT

A computer telephony integration exchange system in which the user can easily use the functions of function codes even though he/she does not know the relevant function codes of the simple digital exchange system. The digital exchange system, including: a computer telephony matching device for dividing received channel 2B+D into a channel B1+D1 and channels B2 and D2, and again transmitting them, combining the channel B1+D1 and the channels B2 and D2 into the channel 2B+D, and again transmitting the combined channel 2B+D; a digital telephone connected with the computer telephony matching device via the channel B1+D1, for transmitting and receiving a voice signal through the channel B1 and control data through the channel D1; a computer connected with the computer telephony matching device via the channel B2 and D2, for transmitting and receiving data through the channel B2 and control data through the channel D2; and a simple digital exchange device connected with the computer telephony matching device via the channel 2B+D, for performing an exchange for the channels B1 and B2, analyzing a signal received through the channel D, and controlling the digital telephone and the computer through the channel D so as to maintain them in a constant state.

25 Claims, 1 Drawing Sheet

COMPUTER TELEPHONE INTEGRATION EXCHANGE SYSTEM

CLAIM OF PRIORITY

This application makes reference to, incorporates the same herein, and claims all benefits accruing under 35 U.S.C. §119 arising from an application for Computer Telephony Integration Exchange System earlier filed in the Korean Industrial Property Office on Dec. 26, 1995 and there duly assigned Ser. No. 56569/1995.

BACKGROUND OF THE INVENTION

The use of integrated service, digital network (i.e., ISDN) lines in telephone communications has become increasing popular. For example, U.S. Pat. No. 5,305,312 for an Apparatus For Interfacing Analog Telephones And Digital Data Terminals to an ISDN Line to Fornek et al. discloses an ISDN interface for up to two analog dual tone multi-frequency telephones and for up to four personal computers or data terminals. ISDN line comprises D channel and two B channels for multiplexing. Also, U.S. Pat. No. 5,204,860 for a Network Terminating Terminal Apparatus For Integrated Services Digital Network to Sparks discloses a network terminator terminal apparatus for use in an ISDN system. A telephone handset as well as a computer terminal communicate via ISDN communication with an outside exchange. Channel 2B+D transmit and receive signals are used in the communication. Next, U.S. Pat. No. 5,276,687 for a Network System Having Different Attributes Of Terminal Equipment Devices to Miyamoto discloses a terminator network that connects a facsimile machine, computers, telephones to an outside transmission line. D channels and B channels are used to communicate between the outside transmission line and the various equipment attached to the network terminator. As a result, numerous electronic communications equipment can use a single telephone access line simultaneously using an ISDN form of communication and a network terminator. Finally, U.S. Pat. No. 5,481,605 for a Private Branch Exchange Capable of Analyzing Information Received From ISDN to Sakurai et al. discloses a private branch exchange capable of using information received in ISDN form. B channels and D channels are used to communicate with various communications equipment including telephones, facsimile machines, and so forth.

I have discovered a need for a simple ISDN circuit that accommodates just one telephone and one computer terminal. Both the telephone and the computer terminal share access to a single telephone line originating from a central office via time multiplexing.

SUMMARY OF THE INVENTION

It is therefore an object to provide telephone and computer access to an ISDN line.

It is also an object to provide a computer telephony integration exchange system in which the user can easily use the functions of function codes even though he/she does not know the relevant function codes of the simple digital exchange system.

It is another object to provide a computer telephony integration exchange system for displaying usable functions on a screen in each state of a simple digital exchange system, thereby facilitating the usage of the functions.

To achieve the objects, a computer telephony integration exchange system in a digital exchange system, includes a computer telephony matching device for dividing a received channel 2B+D into a channel B1+D1 and channels B2 and D2 and transmitting them and by combining the channel B1+D1 with the channels B2 and D2 into a single channel 2B+D and transmitting it. The invention is made up of a digital telephone connected with the computer telephony matching device via the channel B1+D1. For transmitting and receiving a voice signal through the channel B1 and control data through the channel D1, a computer connected with the computer telephony matching device via the channel B2 and D2. For transmitting and receiving data through the channel B2 and control data through the channel D2, and a simple digital exchange connected with the computer telephony matching device via the channel 2B+D, for performing an exchange for the channels B1 and B2 and controlling the digital telephone and the computer through channel D so as to maintain them in a constant state after analyzing a signal received through channel D.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
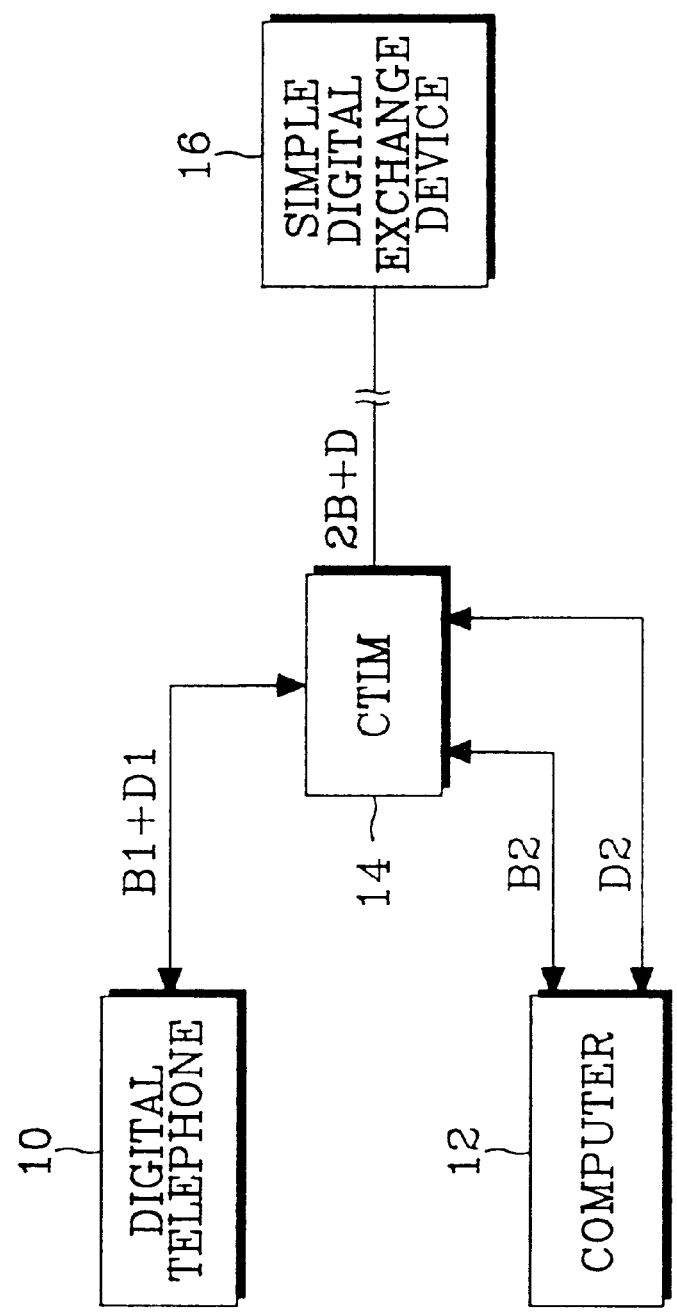
FIG. 1 is a block diagram illustrating the construction of a computer telephony integration exchange system according to the present invention.

Turning to the figures, FIG. 1 is a block diagram illustrating the construction of a computer telephony integration exchange system according to the present invention. A computer telephony integration module (hereinafter, referred to as CTIM) or network terminator 14 as a computer telephony matching device, is connected to a simple digital exchange or exchange network 16 via a channel 2B+D, to a digital telephone 10 via a channel B1+D1, and to a computer 12 via channels B2 and D2. The CTIM 14 connected as above divides the channel 2B+D received from the simple digital exchange 16 into the channel B1+D1 and the channels B2 and D2, and then transmits them to the digital telephone 10 and the computer 12, respectively. It also combines the channel B1+D1 and the channels B2 and D2 which are respectively received from the digital telephone 10 and the computer 12, into the channel 2B+D and again transmits the channel 2B+D which is the result of the combination to the simple digital exchange 16.

The digital telephone 10 which is connected with the CTIM 14 via the channel B1+D1 transmits and receives a voice signal through the channel B1 and control data through the channel D1. At this time, the channel B1+D1 is connected through a general telephone line. Further, the computer 12 connected with the CTIM 14 via the channels B2 and D2 transmits and receives data through the channel B2 and control data through the channel D2. At this time, the channel B2 is connected to a modem or a fax modem installed in an interior of the computer 12 and the channel D2 is connected to a serial communication port of the computer 12. Without adding or changing existing hardware, application program and service provider composed of a graphic user interface (hereinafter, referred to as GUI) are additionally installed to the computer 12, the GUI compatible with a telephony application programming interface (hereinafter, referred to as TAPI) standard. Consequently, a convenient communication control function is provided for the user through the interaction of the CTIM 14 and the simple digital exchange 16.

The simple digital exchange 16 connected with the CTIM 14 via the channel 2B+D performs an exchange for the channels B1 and B2. It also controls the digital telephone 10 and the computer 12 through the channel D to be maintained in a constant state after analyzing the signal transmitted through the channel D. As mentioned hereinbefore, the simple digital exchange 16 of the exchange system displays events occurring in the digital telephone 10 and the computer 12 at the digital telephone 10 and the computer 12 and changes their states. At this moment, the computer 12 displays the usable function under each state at a monitor (not shown), by control of the simple digital exchange 16. Consequently, the user can easily use the usable function under each state even though he/she does not know the function codes. Besides, it is possible that a data communication using the channel B2 and a normal calling are performed at the same time.

As described above, the present invention can give a maximized convenience to the user by displaying the usable function under each state at the screen even if the user does not know functions of the function codes. The user can use voice calling and data communication simultaneously by integrating an analog line and digital line, without difficulties. Inasmuch as the application program and the service provider are additionally installed in the interior of the computer without further adding or changing the existing hardware, it is possible to use the computer telephony integration function with small expense.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A digital exchange system, comprising:
   a computer telephony matching device for dividing received channel 2B+D into a channel B1+D1 and channels B2 and D2, and again transmitting, combining said channel B1+D1 and said channels B2 and D2 into said channel 2B+D, and again transmitting via said combined channel 2B+D;
   a digital telephone connected with said computer telephony matching device via said channel B1+D1, for transmitting and receiving a voice signal through said channel B1 and control data through said channel D1;
   a computer connected with said computer telephony matching device via said channel B2 and D2, for transmitting and receiving data through said channel B2 and control data through said channel D2; and
   a simple digital exchange device connected with said computer telephony matching device via said channel 2B+D, for performing an exchange for said channels B1 and B2, analyzing a signal received through said channel D, and controlling said digital telephone and said computer through said channel D so as to maintain them in a constant state.

2. The system as defined in claim 1, said computer telephony matching device is a computer telephony integration exchange system.

3. The system as defined in claim 2, said channel B1+D1 is connected between said computer telephony matching device and said digital telephone through a general telephone line.

4. The system as defined in claim 3, said channel B2 between said computer telephony matching device and said computer is connected to a modem installed in said computer, and said channel D2 therebetween is connected to a serial communication port of said computer.

5. The system as defined in claim 4, said modem is a fax modem.

6. The system as defined in claim 1, said simple digital exchange displays events occurring in said digital telephone and said computer.

7. The system as defined in claim 6, said computer displays a usable function under each state on a screen of a monitor by control of said simple digital exchange.

8. An Integrated Services Digital Network (ISDN), comprising:
   one digital telephone;
   one computer having a modem;
   one network terminator;
   one exchange network;
   one access line leading to said exchange network;
   a first B channel and a first D channel between said digital telephone and said network terminator;
   a second B channel and a second D channel between said computer and said network terminator; and
   a 2B+D channel between said network terminator and said exchange network, said ISDN allowing said telephone and said computer to communicate simultaneously over a single telephone access line originating from a central office.

9. The system as defined in claim 8, said modem being a fax modem.

10. The system as defined in claim 8, said exchange network displays events occurring in said digital telephone and said computer.

11. The system as defined in claim 8, said computer displays a usable function under each state on a monitor screen by control of said exchange network.

12. A digital exchange system, comprising:
    a computer telephony integration module;
    a digital telephone;
    a computer having a modem and a serial communication port;
    a simple digital exchange system;
    a 2B+D channel connecting said simple digital exchange system to said computer telephone integration module;
    a B1+D1 channel connecting said digital telephone to said computer telephone integration module;
    a B2 channel connecting said computer to said computer telephone integration module; and
    a D2 channel connecting said computer to said computer telephone integration module.

13. The digital exchange system of claim 12, a voice signal is transmitted and received through said B1 channel.

14. The digital exchange system of claim 13, a control data signal is transmitted and received through said D1 channel.

15. The digital exchange system of claim 12, said B2 channel is connected to said modem.

16. The digital exchange system of claim 15, said D2 channel is connected to said serial communication port of said computer.

17. The system as defined in claim 12, said modem is a fax modem.

18. The system as defined in claim 13, said simple digital exchange system displays events occurring in said digital telephone and said computer.

19. The system as defined in claim 13, said computer displays a usable function under each state on a monitor screen by control of said simple digital exchange system.

20. The method of receiving information, comprising:

receiving information from a simple digital exchange via channel 2B+D;

dividing said 2B+D channel into channel B1+D1 and into channels B2 and D2;

receiving channel B1+D1 on a digital telephone; and receiving channels B2 and D2 on a computer having a modem.

21. The method of claim 20, said modem being a fax modem.

22. The method of claim 20, said simple digital exchange displays events occurring in said digital telephone and in said computer.

23. The method of transmitting information, comprising:

transmitting information on channel B1+D1 from a digital telephone;

transmitting information on channels B2 and D2 from a computer having a modem;

combining said B1+D1 channel and said B2 and D2 channels into a 2B+D channel; and transmitting information to a simple digital exchange via said 2B+D channel.

24. The method of claim 23, said modem being a fax modem.

25. The method of claim 23, said simple digital exchange displays events occurring in said digital telephone and in said computer.

* * * * *